R. BOWEN.
CAMERA ATTACHMENT.
APPLICATION FILED MAR. 23, 1915.
1,158,025.
Patented Oct. 26, 1915.
2 SHEETS—SHEET 1.
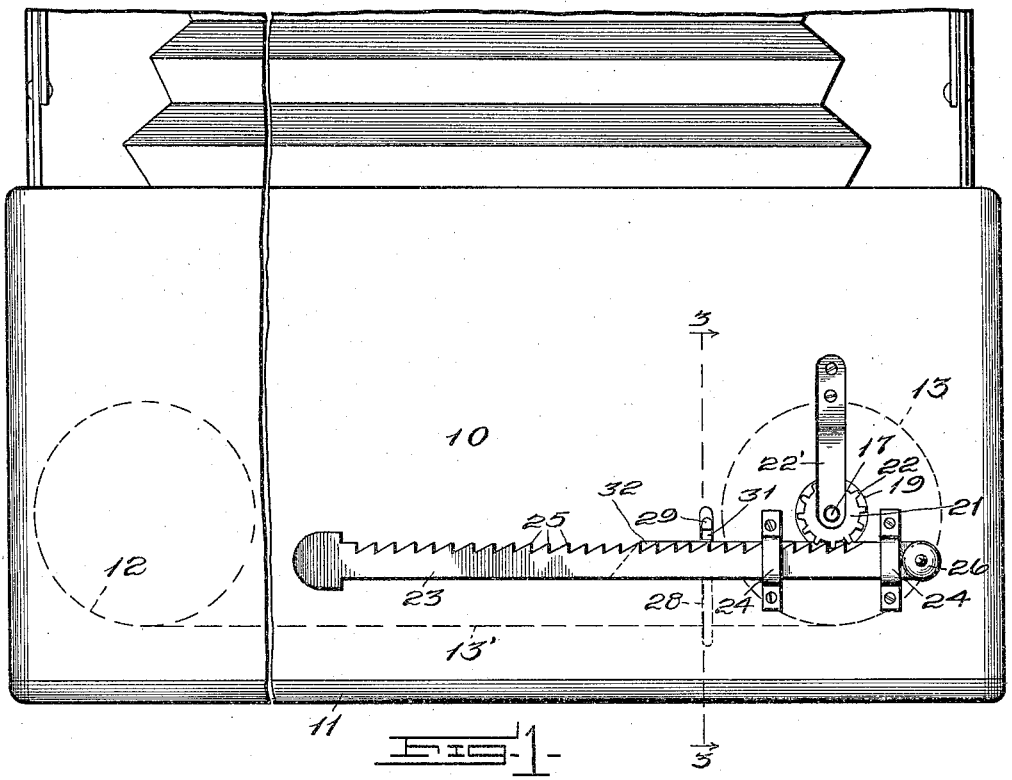
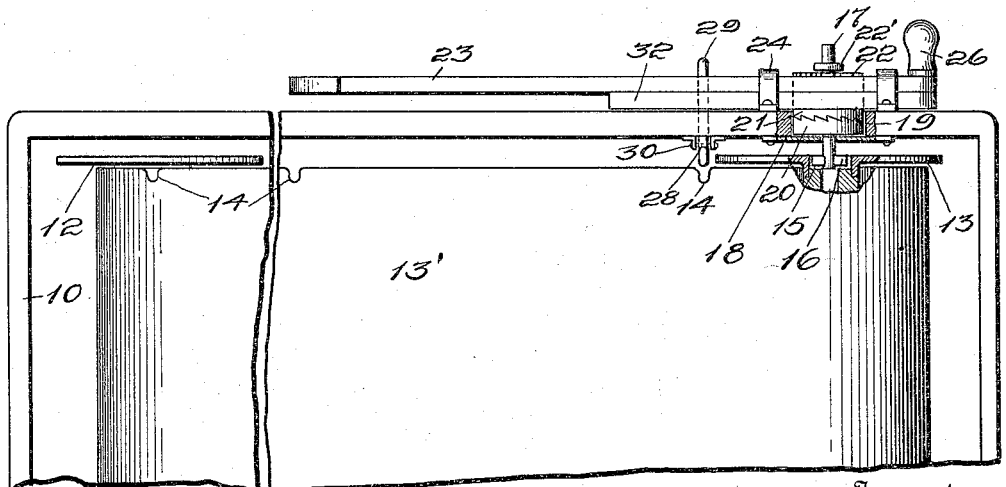
Witnesses
Inventor
Roy Bowen,
By
C. L. Parken
Attorney R. BOWEN.
CAMERA ATTACHMENT.
APPLICATION FILED MAR. 23, 1915.
1,158,025.
Patented Oct. 26, 1915.
2 SHEETS—SHEET 2.
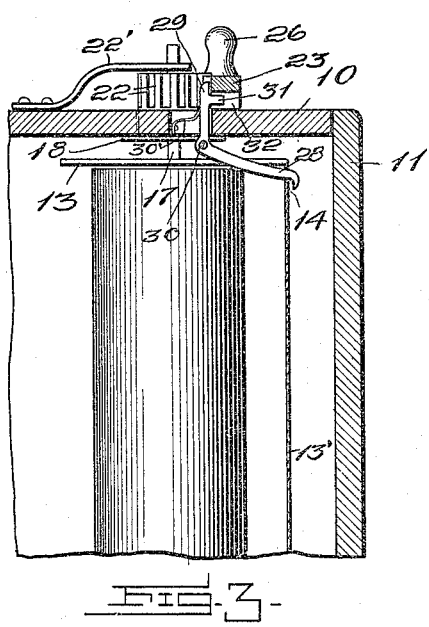
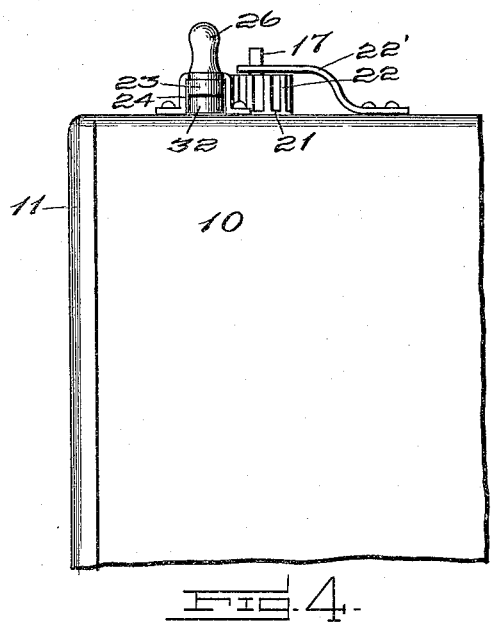
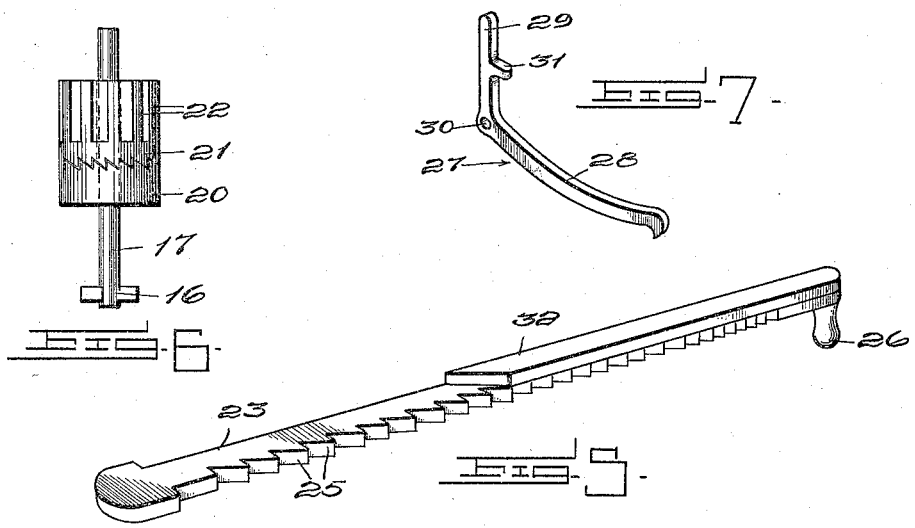
Witnesses
Inventor
Roy Bowen,
By C. L. Parker, Attorney

UNITED STATES PATENT OFFICE.

ROY BOWEN, OF HOOPESTON, ILLINOIS.

CAMERA ATTACHMENT.

1,158,025.  Specification of Letters Patent.  Patented Oct. 26, 1915.

Application filed March 23, 1915. Serial No. 16,419.

*To all whom it may concern:*

Be it known that I, ROY BOWEN, a citizen of the United States, residing at Hoopeston, in the county of Vermilion and State of Illinois, have invented certain new and useful Improvements in Camera Attachments, of which the following is a specification.

My invention relates to improvements in apparatus for advancing the film of a camera.

An important object of the invention is to provide novel and simple means for accurately advancing the film of a camera for a desired distance, in a highly convenient and expeditious manner.

A further object of the invention is to provide means of the above mentioned character, which are simple in construction, inexpensive to manufacture, strong, and durable.

Other objects and advantages of the invention will be apparent during the course of the following description.

In the accompanying drawings forming a part of this specification and in which like numerals are employed to designate like parts throughout the same, Figure 1 is a plan view of a camera with my apparatus applied thereto, Fig. 2 is a fragmentary rear side elevation of a camera, parts removed and parts in section for the purpose of illustration, showing my invention in elevation and section, applied thereto, Fig. 3 is a vertical sectional view taken on line 3—3 of Fig. 1, Fig. 4 is an end elevation of the reciprocatory bar and associated elements, Fig. 5 is an inverted perspective view of the reciprocatory bar, Fig. 6 is a side elevation of a clutch, and, Fig. 7 is a perspective view of a control lever.

In the drawings wherein for the purpose of illustration is shown a preferred embodiment of my invention, the numeral 10 designates a box or body portion of a camera of any well known or preferred construction. This camera has its rear side normally closed by a door 11, detachably connected therewith and shown removed in Fig. 2.

Detachably mounted within the box 10 is a carrying spool 12 and a winding or take-up spool 13, to which is connected a film 13', having spaced notches or openings 14 upon one longitudinal edge, for determining the extent of step-by-step movement of the film for each picture. The winding spool 13 may be of any well known construction and is provided in one end with a recess or socket 15, which may be square in cross-section, for detachably receiving a head or lug 16, rigidly mounted upon a shaft 17, which is rotatable and longitudinally movably mounted through an opening in a plate or bearing 18, attached to one side of the box 10, with an enlarged opening 19 adjacent thereto, as shown. Any suitable means (not shown) may be employed to pivotally support the opposite end of the spool 13. Rigidly mounted upon the shaft 17 is a clutch element or wheel 20, having ratchet teeth upon its outer end, to engage with ratchet teeth carried by the inner end of a driving wheel 21. This driving wheel is also provided upon its periphery with pinion teeth 22, for a purpose to be described. The driving wheel or gear 21 is loosely mounted upon the shaft 17. Attached to the side of the box 10 and preferably arranged upon the exterior thereof is a suitably stiff leaf spring 22', the free end of which is apertured for loosely receiving the shaft 17 and contacting with the driving wheel 21 to hold the two sets of ratchet teeth in engagement with each other. It is obvious that the spring 22' permits of the outward longitudinal movement of the shaft 17 whereby the spool 13 may be removed and the driving wheel 21 may also move longitudinally of the shaft 17, when rotated clockwise.

The numeral 23 designates a preferably reciprocatory rack-bar, preferably arranged upon the exterior of the box 10 and operating through stationary guide brackets 24. The rack-bar 23 is provided upon one longitudinal edge with ratchet teeth 25, which serve a double function, one of which is to engage with the pinion teeth 22 and rotate the wheel 21 in opposite directions. The rack-bar 23 is provided at one end with a knob 26 by means of which it may be conveniently moved. The pinion 21 has its pinion teeth sufficiently long whereby they will remain in constant mesh with the ratchet teeth 25 of the bar 23, when rotating the pinion 21 in either direction.

Means are provided to positively arrest the longitudinal movement of the bar 23 to the right, when the film 13' has traveled the desired distance, this movement of the bar 23 varying with the increased diameter of the film wound upon the spool 13. This means comprises an approximately L-shaped control lever 27, embodying arms 28 and 29, The lever 27 is pivoted at 30 and is swung in one direction by a spring 30', as shown. The arm 28 has its free end preferably slightly hooked and is arranged in proximity to the edge of the film 13', provided with the openings or notches 14, as shown. The arm 29 of this lever is provided near and spaced from its free end with a laterally extending tooth or portion 31, adapted to engage with a cam member 32, rigidly secured to the lower side of the bar 23, adjacent its forward end. This cam member 32 has its inner end beveled or inclined, as shown. When the tooth 31 slides off of the tapered end of the cam 32, the free end of the arm 28 engages the film, and when this end enters one of the openings or notches 14, the lever 27 is swung upon its pivot, whereby the free end of the arm 29 engages one of the ratchet teeth 25, thus preventing further forward movement of the bar 23.

The operation of the apparatus is as follows: Assuming that the rack-bar 23 is in the inner or starting position with the knob 26 engaging one guide bracket 24, and it is desired to advance the film 13' a step for taking the next picture, the operator pulls the bar 23 forwardly or to the right. This bar is now free to move as the tooth 31 engages the cam member 32 and slides upon the longitudinal edge thereof for the first part of the movement of the bar 23 and finally slides off of the rear end thereof. When this takes place the end of the arm 28 slidably engages the edge of the film 13', (the adjacent notch 14 having moved out of proximity thereto) and when the bar 23 has been moved forwardly to bring the next opening or notch 14 into proximity to the free end of the arm 28, such free end enters the notch whereby the lever 27 swings upon its pivot and the free end of the arm 29 engages one of the ratchet teeth 25, thus positively preventing further movement of the bar 23 in its forward direction. This movement of the bar 23 turns the pinion 21 counter-clockwise, which rotation is imparted to the spool 13 for rotating it and advancing the film. It is thus apparent that the film will be accurately advanced for the desired distance. The bar 23 is now preferably returned to the inner or starting position and is accordingly moved longitudinally in an inward or opposite direction. The bar 23 now turns the driving pinion 21 in the opposite direction, and the ratchet teeth thereof trip upon the ratchet teeth of the clutch element 20, the spool 13 being held against unwinding by the usual means, such as pawl and ratchet means, not shown. The end of the arm 29 now also trips upon the ratchet teeth 25 until the tooth 31 again engages the cam member 32, for raising the end of the arm 29 out of engagement with these ratchet teeth. When the tooth 31 again engages with the cam 32, the end of the arm 28 is moved out of the notch 14.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a camera, a winding spool to hold a film having notches, a clutch element provided with ratchet teeth for turning the winding spool in one direction, a driving wheel provided with ratchet teeth for engaging the first named ratchet teeth and having pinion teeth, a bar provided with ratchet teeth arranged to engage the pinion teeth of the driving wheel, and a movable element arranged to engage with the film to enter the notches and adapted when within a selected notch to engage with a tooth of the bar to hold it against movement in one direction, and means to move the element toward the film.

2. In a camera, a winding spool for a film having notches, a driving pinion, clutch mechanism connecting the driving mechanism and winding spool, a longitudinally movable bar having teeth engaging the pinion to rotate it, and a movable element arranged to engage the film to enter the notches and adapted when within a selected notch to engage with the bar for holding it against movement in one direction.

3. In a camera, a winding spool for a film provided upon its edges with notches, a driving pinion having connection with the spool to turn it, a longitudinally movable bar having teeth engaging the pinion to rotate it, and a pivoted control lever having one end thereof adapted to slidably engage with the edge of the film and enter the notch whereby its opposite end moves into engagement with a tooth of the rack-bar.

4. In a camera, a winding spool for a film provided upon its edge with notches, a driving pinion, clutch mechanism connecting the pinion with the spool and operative when rotated in one direction and inoperative when turned in an opposite direction, a longitudinally movable rack-bar having its teeth engaging the pinion, a pivoted control lever having one end thereof adapted to engage with the edge of the film and enter the notch and its opposite end adapted to engage with a tooth of the rack-bar, and means to swing the control lever in an opposite direction whereby it is moved out of the notch and disengages said tooth.

5. In a camera, a winding spool for a film provided upon its edges with notches, a driving pinion, clutch mechanism connecting the pinion to the spool and operative when rotating in one direction and inoperative when turned in an opposite direction, a longitudinally movable bar provided with ratchet teeth to engage the pinion, a pivoted control lever having one end adapted to engage with the edge of the film and its opposite end to engage with a ratchet tooth of the bar, a spring to swing the lever in the direction to cause its end to engage with said tooth, and a cam member carried by the bar and adapted to engage with the lever to swing it in an opposite direction to release the bar.

In testimony whereof I affix my signature in presence of two witnesses.

ROY BOWEN.

Witnesses:
C. G. FLEXMAN,
G. E. LESTER.

Copies of this patent may be obtained for five cents each, by addressing the "Commissioner of Patents, Washington, D. C."